R. LIGGITT.
AXLE ARM.
APPLICATION FILED MAR. 1, 1917.

1,255,029.

Patented Jan. 29, 1918.

INVENTOR
ROBERT LIGGITT.
by Featherstonaugh & Co
Attys.

UNITED STATES PATENT OFFICE.

ROBERT LIGGITT, OF DURHAM, ONTARIO, CANADA.

AXLE-ARM.

1,255,029.  Specification of Letters Patent.  Patented Jan. 29, 1918.

Application filed March 1, 1917. Serial No. 151,781.

*To all whom it may concern:*

Be it known that I, ROBERT LIGGITT, of the town of Durham, in the county of Grey, in the Province of Ontario, Canada, have invented certain new and useful Improvements in Axle-Arms, of which the following is the specification.

My invention relates to improvements in axle arms and the object of the invention is to devise means for retaining the grease or oil between the wearing surfaces in contact and for preventing the entrance of dust or moisture between such surfaces and it consists essentially of the following arrangement and construction of parts as hereinafter more particularly explained by the following specification.

In the drawings like letters of reference indicate corresponding parts in each figure.

Figure 1:
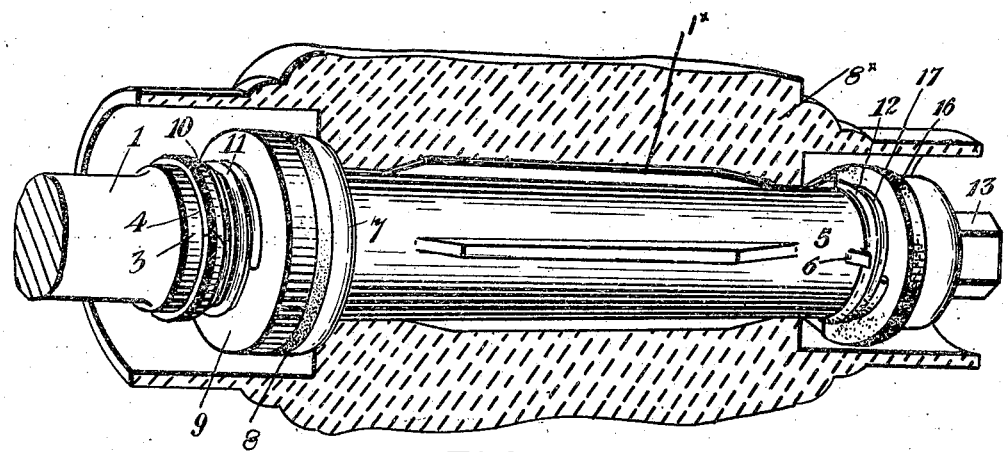
Figure 1, represents a general perspective view of an axle arm constructed in accordance with my invention and a portion of a wheel hub mounted thereon.
Figure 2:
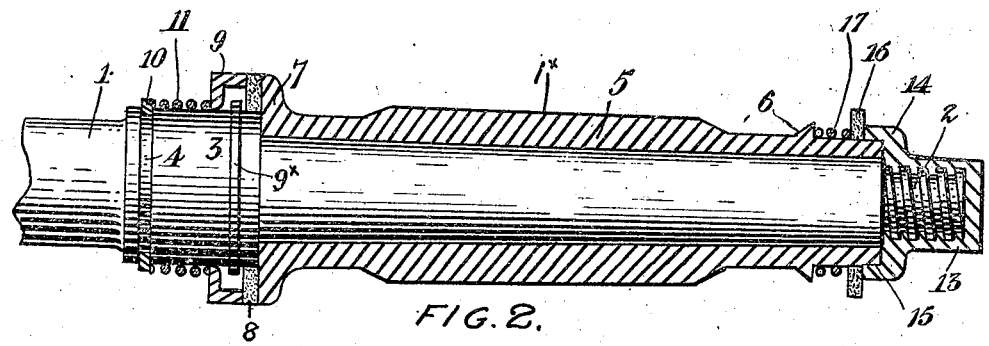
Fig. 2, is a side elevation of an axle arm showing the bushing sleeve and co-acting structure in section.

1 indicates an axle arm, which is tapered in the usual manner and provided with longitudinal ribs $1^x$ and at its outer end with a reduced externally threaded portion 2 and at its inner end with an enlargement 3 provided with an annular groove 4. 5 indicates a bushing sleeve provided in proximity to one end with projections 6 on a line with the ribs $1^x$ and at its opposite end with a flange enlargement 7. The bushing sleeve 5 is designed to be driven into the hub $8^x$ to be secured therein so that the flange enlargement 7 bears against one face of the hub and the opposite end protrudes therefrom beyond the annular groove 6. 8 indicates a leather washer which surrounds the axle arm enlargement 3 and bears up against the outer face of the flange enlargement 7 so as to seal the joint between the flange enlargement 7 and the enlargement 3 of the axle arm. 9 indicates a metal ring surrounding the enlargement 3 and bearing against the outer face of the washer 8 in proximity to its exterior surface. $9^x$ indicates an enlargement extending from the portion 3 to limit the movement of the ring 9 when the axle arm is removed from the hub. 10 indicates a spring ring preferably rectangular in cross section, which is sprung into the groove 4. 11 indicates a compression spring surrounding the enlargement 3 between the rings 10 and 9. 13 indicates a nut screwed on to the threaded end 2 of the axle arm and provided with an enlarged end 14, the inner face of which is recessed at 15 to fit the extreme end of the bushing sleeve 5.

16 indicates a washer surrounding the bushing sleeve and bearing up against the enlarged end 14 of the nut. 17 indicates a compression spring extending between the projections and washer 16. The washer 16 is formed of comparatively stiff leather. By this means it will be seen that oil or other lubricating fluid, which is fed into the interior of the bushing sleeve 5 so as to lubricate the contacting surfaces formed between the sleeve 5 and axle arm, will be absolutely prevented from escaping from between such surfaces at either end of the axle arm and at the same time will seal the joints formed at the ends of the axle arm between such arm and the bushing sleeve so as to prevent any grit or dirt entering between such contacting surfaces.

From this description it will be seen that I have devised a very simple device whereby oil or other lubricating fluid will be retained between the contacting surfaces, which will prevent the entrance of dirt, grit or moisture between such surfaces.

What I claim as my invention is.

1. The combination with an axle arm and bushing sleeve, of a packing washer surrounding the axle arm and bearing against the sleeve end, of a removable abutment carried by the axle arm, and resilient means bearing at one end against such abutment and at the opposite end against the washer.

2. The combination with an axle arm having an annular groove and a bushing sleeve, of a packing washer surrounding the axle arm and bearing against the end of the bushing sleeve, a split ring inserted in the groove of the axle arm and protruding therefrom, and spring pressed means bearing at one end against such split ring and at the opposite end against the packing washer.

3. The combination with an axle arm having an enlargement at its inner end having an annular groove therein, of a bushing sleeve mounted upon the axle arm and having a flange enlargement at its inner end bearing against the enlargement of the axle arm and protruding radially therefrom, a packing washer surrounding the enlargement of the axle arm and bearing against the flange enlargement of the bushing sleeve, a metal ring surrounding the enlargement of the axle arm and bearing against the packing washer, a split ring fitting into the groove of the axle arm enlargement and protruding therefrom, and a compression spring extending between the split ring and the metal ring.

4. The combination with an axle arm having a reduced threaded outer end, a nut threaded on such reduced end having an enlarged recessed inner portion, a bushing sleeve mounted upon the axle arm, the inner end of which extends into the recess of the nut, a packing washer surrounding the bushing sleeve and bearing against the enlargement of the nut, an abutment carried by the bushing sleeve, and a compression spring extending between the abutment and washer.

ROBERT LIGGITT.

Witnesses:
JOHN P. TELFORD,
JESSIE REED.

Copies of this patent may be obtained for five cents each, by addressing the "Commissioner of Patents, Washington, D. C."